United States Patent

Puskas

[15] 3,681,626

[45] Aug. 1, 1972

[54] OSCILLATORY CIRCUIT FOR ULTRASONIC CLEANING APPARATUS

[72] Inventor: William L. Puskas, Trumbull, Conn.

[73] Assignee: Branson Instruments, Incorporated, Stamford, Conn.

[22] Filed: Nov. 11, 1971

[21] Appl. No.: 197,701

[52] U.S. Cl. ....................................310/8.1, 318/116

[51] Int. Cl. ..............................................H01v 7/00

[58] Field of Search ............310/8, 8.1; 318/116, 118

[56] References Cited

UNITED STATES PATENTS

| | | | |
|---|---|---|---|
| 3,432,691 | 3/1969 | Shoh | 310/8.1 |
| 3,581,125 | 5/1971 | Arndt et al | 310/8.1 |
| 3,584,244 | 6/1971 | Vest | 310/8.1 |

*Primary Examiner*—J. D. Miller
*Assistant Examiner*—Mark O. Budd
*Attorney*—Ervin B. Steinberg

[57] ABSTRACT

An oscillatory circuit for ultrasonic cleaning apparatus, omitting an output transformer, includes a half bridge transistor switching circuit and an oscillatory circuit to which a variable quantity of ultrasonic transducers are connectable. The feedback circuit for causing the transistors to be alternatingly conductive comprises a transformer winding and the serially connected parallel connection of a capacitor and unidirectional current conduction means (rectifier) so selected that during the non-conductive period the associated transistor is biased with a potential slightly less than the base-emitter electrode breakdown voltage.

5 Claims, 9 Drawing Figures

OSCILLATORY CIRCUIT FOR ULTRASONIC CLEANING APPARATUS

BRIEF SUMMARY OF THE INVENTION

The present invention concerns an oscillatory circuit for an ultrasonic cleaning apparatus and more specifically refers to a transistorized oscillatory circuit which is characterized by a high degree of efficiency and reliability resulting in part from a feedback circuit which assures that the transistors provided in the circuit are switched under ideal conditions. The present invention, moreover, discloses an electronic circuit which makes use of a so-called half bridge transistor switching circuit which energizes an oscillatory circuit to which a variable quantity of piezoelectric transducers are coupled and including feedback means for controlling the alternating conductive cycles of the transistors in such a manner that one of the transistors is biased in the reverse direction to the maximum allowed inverse voltage before the other transistor is biased in the forward direction for being rendered conductive. A further most important feature of the present invention concerns the absence of power resistors in the feedback circuit to the transistors, thereby assuring a high degree of efficiency. Still another significant feature of the present invention concerns the provision of an electronic circuit for an ultrasonic cleaning apparatus omitting the customary power transformer.

Further and still other objects of the present invention will be more clearly apparent by reference to the following description when taken in conjunction with the accompanying drawings.

DETAILED DESCRIPTION

Figure 1:
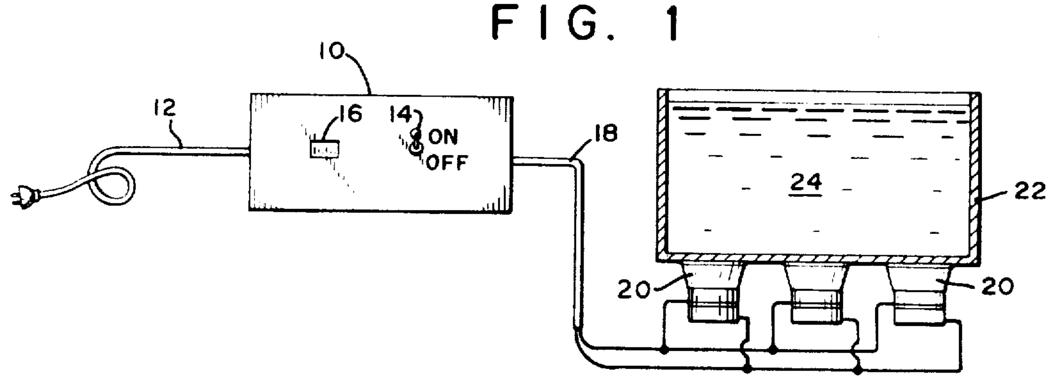
FIG. 1 is a schematic illustration showing the general arrangement of an ultrasonic cleaning apparatus.
Figure 2:
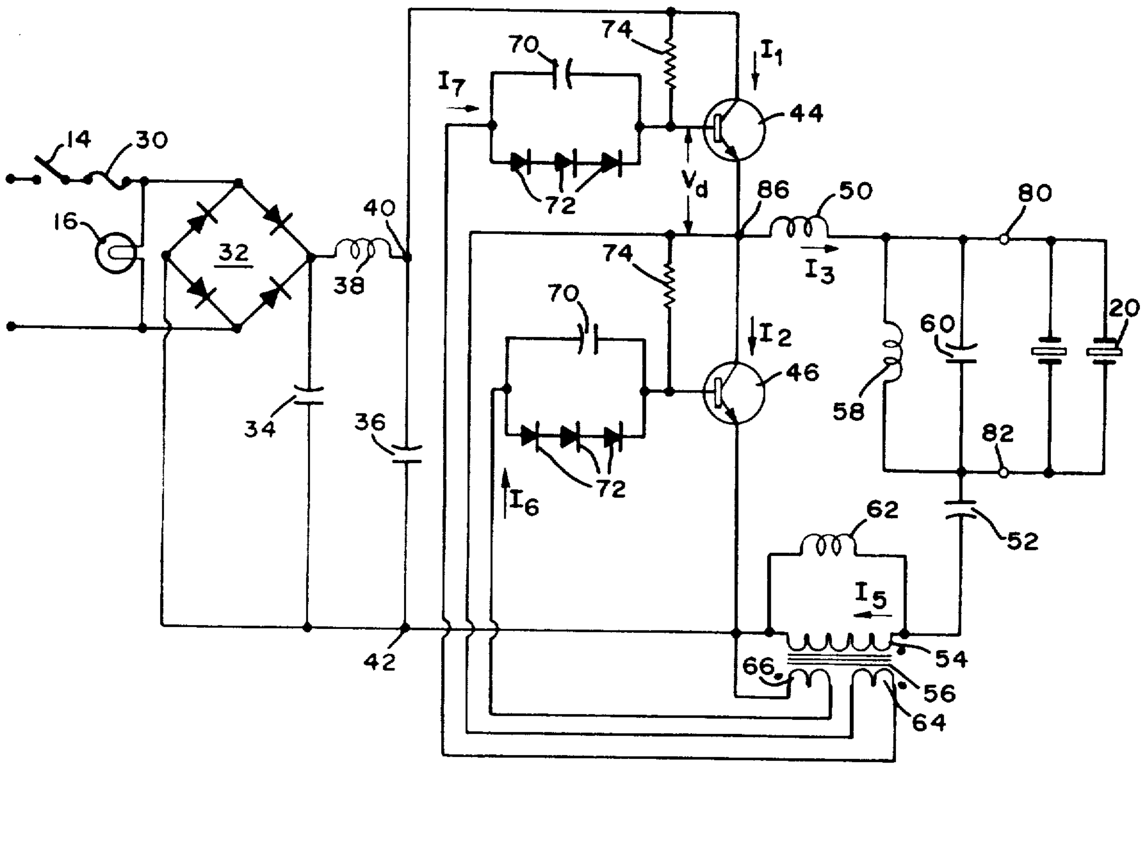
FIG. 2 is a schematic circuit diagram of the preferred embodiment of the present invention.

Referring now to the figures and FIG. 1 in particular, numeral 10 identifies a cabinet which contains one or more of the electronic circuits shown in FIG. 2. The cabinet 10 is provided with a power input cable 12, a power switch 14 and a power "ON" indicating light 16. An output cable 18 provides high frequency electrical energy, typically at a frequency of 25 kHz, to a plurality of transducers 20 which electrically are connected in parallel with one another and which mechanically are coupled to the underside of a tank 22 which under operating conditions contains a suitable cleaning solvent 24. Each of the transducers 20 may, in a typical example, be constructed as shown in U.S. Pat. No. 3,066,232 issued to N. G. Branson, entitled "Ultrasonic Transducer" on Nov. 27, 1962.

Each of the transducers includes one or more piezoelectric disks which responsive to electrical high frequency energy provide vibratory energy. The transducers 20 are bonded to the underside of the tank 22 by suitable means, such as epoxy resin, as is well understood in the art. Upon closing the power switch 14 high frequency is provided via cable 18 to the piezoelectric disks of the transducers 20 and they, in turn, are set into mechanical resonance, causing vibratory energy to be imparted to the solvent 24 to provide cavitation therein, all as is well understood in the art.

The enclosure 10 may contain several of the electronic circuits shown schematically in FIG. 2 having their respective input and output terminals connected in parallel for providing output power which is greater than that available from a single circuit module. Referring now to this figure, alternating current at power line voltage and frequency is applied via switch 14 and fuse 30 to a bridge type rectifier 32 which, in turn, is connected to a filter circuit comprising two capacitors 34 and 36 and an inductance 38. The rectification results in a supply of direct current with positive polarity at terminal 40 and negative polarity at terminal 42. This direct current source supplies energy to the present oscillatory circuit. In order to energize the oscillatory circuit, there is provided a switching circuit which comprises a pair of serially connected transistors 44 and 46 coupled across the terminals 40 and 42. The transistors are connected in the form known as a voltage type half bridge circuit wherein current flows alternatingly through transistor 44 and then through transistor 46 as will be explained in greater detail later.

The oscillatory circuit coupled to the switching circuit comprises the series connection of an inductance coil 50, a direct current blocking capacitor 52, the primary winding 54 of a feedback transformer 56 and the parallel resonant circuit comprising a further inductance 58 and further capacitor 60. Inductive means such as an inductance coil 62 is connected in parallel with the primary transformer coil 54 in order to provide phase correction and, in the present instance, a voltage signal for feedback purposes to the transistors which has a slightly leading phase angle relative to the current through the oscillatory circuit. The transformer 56 is provided with a pair of secondary coils 64 and 66 which provide the feedback signals through potential limiting means to the respective transistors 44 and 46. Each potential limiting means, coupled in series with the feedback winding, comprises a capacitor 70 connected in parallel with one or more unidirectional current conducting devices 72, such as a diode rectifier. The circuit includes also a conventional starting resistor 74 coupled between the base and collector electrodes of each transistor.

The oscillatory circuit includes output terminals 80 and 82 across which the electrical connections of the transducers 20 are connected. The quantity of transducers may be variable and, in a typical case, a quantity between one to eight transducers may be connected to the circuit illustrated in FIG. 2. The capacitances and inductances must be so selected that the effective (summed) capacitive reactance $X_C$ equals the inductive reactance $X_L$ of the circuit and that the electrical frequency of resonance of the circuit is substantially at a value which matches the mechanical resonance of the transducers 20. In order to increase the stability of the circuit and provide for variations in the number of transducers 20 which may be connected to the terminals 80 and 82, the capacitor 60 is selected to have a capacitance value which at least is equal to the summed clamped capacitance of the transducers 20 and preferably is greater than such capacitance, typically by a factor of two. The windings 66 and 64 are phased in such a manner that the transistors 44 and 46 are rendered conductive in alternating half cycles of the oscillatory frequency.

Figures 3A, 3B, 3C, 3D, 3E, 3F, 3G:
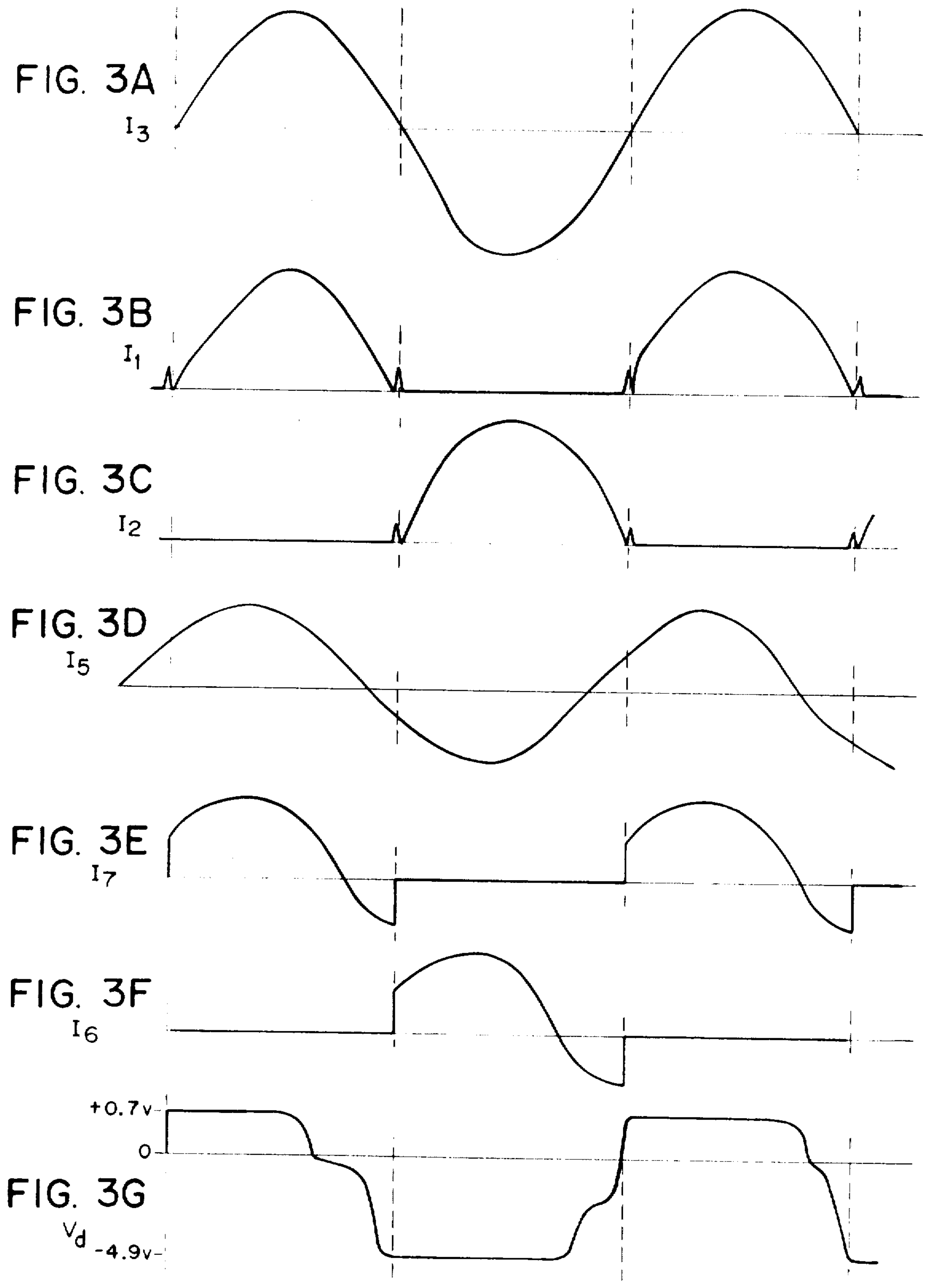
FIGS. 3A through 3G are illustrations of current and voltage wave shapes obtained at various points in the schematic diagram of FIG. 2.

Operation of the circuit may be visualized as follows: During a first half cycle the transistor 44 is rendered conductive and current from the positive terminal 40 flows through the transistor 44 to the terminal 86 which is a midpoint between the series connection between the transistors 44 and 46. Transistor 46 is non-conductive at this moment. The current from terminal 86 flows through the inductance 50, through the parallel combination of inductance 58, capacitor 60 and transducers connected thereto, through the direct current blocking capacitor 52, the primary winding 54 and inductance coil 62 coupled in parallel to the negative terminal 42. During the next half cycle the transistor 46 is rendered conductive and the transistor 44 is rendered non-conductive so that current flows in the reverse direction from the terminal 86 through the transistor 46, through the primary winding 54 and parallel connected inductance 62, capacitor 52, the parallel resonant circuit comprising inductance 58, capacitor 60 and transducers 20, and inductance coil 50. This causes an alternating current $I_3$ in the oscillatory circuit of the wave form shown in FIG. 3A. The alternating periods of current conduction through the transistors 44 and 46, currents $I_1$and $I_2$, are shown in FIGS. 3B and 3C. The alternating current $I_5$ through the primary winding 54 of the feedback transformer is shown in FIG. 3D.

It will be noted that the present circuit drives the transducers 20 without the use of the well known and usually employed output transformer which couples the transducers 20 to the oscillatory circuit. The necessary voltage step up for driving the transducers 20 is achieved by suitable dimensioning the series inductance coil 50 in such a way as to obtain the desired peak voltage. Also, the inductance coil serves to suppress higher harmonics.

A further and most important feature of the present invention resides in the fact that there is no overlapping current conduction of the transistors. As clearly seen from FIG. 3B and FIG. 3C, each transistor has terminated its half cycle current conduction before the other transistor is rendered conductive. Such an overlap is quite common when using the half bridge switching circuit, but has carefully been remedied in the present embodiment. The inductance coil 62 is dimensioned to provide a sufficient amount of phase shift to render the voltages appearing across the secondary feedback coils 64 and 66 slightly leading relative to the current $I_3$ so as to assure that the one transistor is fully biased in the reverse direction before the other transistor becomes biased in the forward direction, that is rendered conductive. The feedback circuit elements comprising the capacitor 70 and diodes 72 provide reverse bias to the maximum permissible voltage. In the present example, the capacitor 70 during the conduction period of the associated transistor becomes charged and the voltage across the capacitor is held to 2.1 volts by means of three series connected rectifiers, each rectifier having a 0.7 volt forward voltage drop. The transformer winding provides a voltage of 2.8 volts peak for each half cycle, or 5.6 volts peak to peak. During the non-conductive half cycle the 2.8 volt negative peak voltage is augmented by the 2.1 volt bias to provide a negative voltage potential of 4.9 volts, see FIG. 3G. The value of minus 4.9 volts is slightly less than the base to emitter electrode breakdown voltage which, in this example, is 5.0 volts. The shape of the currents $I_6$ and $I_7$ in the feedback circuit is illustrated in FIGS. 3E and 3F.

It will be appreciated by those skilled in the art that the present circuit is certainly characterized by extreme simplicity, that is, a minimum Moreover, circuit elements, especially the absence of an output transformer. MOreover, the present circuit provides ideal wave shapes in the oscillatory circuit as well as for loading the switching transistors during the switching cycle. The overlap of conductive periods, that is both transistors being concurrently conductive for a portion of the cycle, has been eliminated. Furthermore, the circuit achieves its goals without the use of power resistors in the feedback circuit, thus providing a high degree of efficiency. Last but not least, the selection of the capacitor in parallel with the transducers is selected so that the circuit is relatively insensitive to a change in the capacitance caused by a variable quantity of transducers or even an electrical or mechanical failure of a transducer. These features make the disclosed circuit substantially insensitive to variable loads, such as is found in ultrasonic cleaning installations where the load of a tank changes as a function of water level, cleaning solvent, and charge. The present apparatus is one which constitutes a significant improvement over the heretofore existing circuits, especially when considering cost, reliability, simplicity of operation and suitability for different loading conditions.

What is claimed is:

1. An oscillatory circuit for an ultrasonic cleaning apparatus comprising:

a source of direct current;

a pair of transistors serially coupled across said source;

an oscillatory circuit coupled respectively to one pole of said source and to a midpoint between said pair of said transistors and including the series connection of a first inductance, a capacitor, the primary winding of a feedback transformer and the parallel connected combination of a further capacitor and a second inductance;

a pair of secondary transformer windings inductively coupled to said primary winding to provide a pair of respective feedback signals;

means coupling said feedback signals to said respective transistors for causing said transistors to be alternatingly rendered conductive whereby to sustain the oscillatory circuit in its oscillatory state;

inductive means coupled in circuit with said primary winding to cause said feedback signals to have a slightly leading phase angle relative to the current through said oscillatory circuit to cause the current flow through said respective transistors to be in phase with the alternating half cycles of current flow through said oscillatory circuit and to cause one transistor to be rendered substantially non-conductive before the other transistor is rendered conductive responsive to the applied feedback signal;

bias potential means coupled in circuit between each of said transistors and said respective secondary transformer winding for providing an amplitude limited feedback potential during the conducting period of the associated transistor which potential during the non-conducting period is added to the potential provided by the respective secondary winding to cause during the latter period a negative potential of increased amplitude across the base and emitter electrodes of such transistor, and means for connecting piezoelectric ultrasonic transducers across said parallel connected combination for providing mechanical energy responsive to electrical excitation.

2. An oscillatory circuit for an ultrasonic cleaning apparatus as set forth in claim 1, said inductive means comprising an inductance coil coupled in parallel with said primary winding.

3. An oscillatory circuit for an ultrasonic cleaning apparatus as set forth in claim 1, said bias means comprising the parallel connection of a capacitance and a unidirectional current conduction means coupled serially in circuit with a respective transistor and the associated secondary winding.

4. An oscillatory circuit for an ultrasonic cleaning apparatus as set forth in claim 3, said unidirectional current conduction means being dimensioned for providing across said capacitance connected in parallel therewith a potential which when added to the voltage provided by the associated secondary transformer winding during the non-conducting period results in a value which is slightly less than the emitter to base electrode breakdown voltage of the selected transistor.

5. An oscillatory circuit for an ultrasonic cleaning apparatus as set forth in claim 3, said unidirectional current conduction means comprising a plurality of diode rectifiers connected in series.

* * * * *